United States Patent [19]

Ueta et al.

[11] Patent Number: 5,197,747

[45] Date of Patent: Mar. 30, 1993

[54] METALLIC GASKET WITH CYLINDER BEADS ON SEPARATE PLATES TO ALLOW FOR MINIMAL INTERCYLINDER SPACE

[75] Inventors: Kosaku Ueta; Ikkoh Ueta, both of Kumagaya, Japan

[73] Assignee: Nihon Metal Gasket Co., Ltd., Kumagaya, Japan

[21] Appl. No.: 726,425

[22] Filed: Jul. 5, 1991

[30] Foreign Application Priority Data

Jul. 5, 1990 [JP] Japan ............................ 2-178423
May 23, 1991 [JP] Japan ............................ 3-147780

[51] Int. Cl.$^5$ ........................................ F16J 15/08
[52] U.S. Cl. ............................ 277/235 B; 277/234; 277/236; 277/180
[58] Field of Search .............. 277/235 B, 233, 234, 277/235 R, 236, 180

[56] References Cited

U.S. PATENT DOCUMENTS

| | | | |
|---|---|---|---|
| 2,197,916 | 4/1940 | Balfe | 288/29 |
| 3,668,036 | 6/1972 | Farnam | 156/252 |
| 4,290,616 | 9/1981 | Nicholson | 277/235 |
| 4,428,593 | 1/1984 | Pearlstein | 277/253 |
| 4,721,315 | 1/1988 | Ueta | 277/236 X |
| 4,728,110 | 3/1988 | Nakasone | 277/213 |
| 4,759,585 | 7/1988 | Udagawa | 277/235 B |
| 4,765,634 | 8/1988 | Kobayashi et al. | 277/235 B |
| 4,810,591 | 3/1989 | Sakai | 428/652 |
| 4,836,562 | 6/1989 | Yoshino | 277/235 |
| 4,898,396 | 2/1990 | Udagawa | 227/235 |

FOREIGN PATENT DOCUMENTS

| | | | |
|---|---|---|---|
| 0160549 | 1/1985 | Japan | 277/235 B |
| 61-103668 | 7/1986 | Japan | 277/235 B |
| 62-261761 | 11/1987 | Japan | 277/235 B |
| 0210464 | 9/1988 | Japan | 277/235 B |
| 63-293363 | 11/1988 | Japan | 277/235 B |
| 0079471 | 3/1989 | Japan | 277/235 B |
| 0083843 | 3/1989 | Japan | 277/235 B |
| 1-104953 | 4/1989 | Japan | 277/235 B |
| 0285644 | 11/1989 | Japan | 277/235 B |
| 1-285645 | 11/1989 | Japan | 277/235 B |

OTHER PUBLICATIONS

"Metal Handbook", 1948 Edition, ASM, pp. 841, 902, 925-926.

*Primary Examiner*—William A. Cuchlinski, Jr.
*Assistant Examiner*—James K. Folker
*Attorney, Agent, or Firm*—Varnell Legal Group

[57] ABSTRACT

A metallic gasket for multi-cylindered arrangements includes two base plates formed of a resilient metal, each having an array of beads on the peripheral edge of an opening provided for a combustion chamber. One of said base plates is provided with an array of arched beads which are associated with an odd-numbered cylinder and displaced from the center of an inter-cylinder space in a given direction to define flat segments on which stoppers are located, and the other base plate is provided with an array of arched beads which are associated with an even-numbered cylinder and displaced from the center of the inter-cylinder space in a direction opposite to the first-mentioned given direction to define flat segments on which stoppers are located. The base plates being laminated antisymmetrically with respect to each other.

13 Claims, 3 Drawing Sheets

METALLIC GASKET WITH CYLINDER BEADS ON SEPARATE PLATES TO ALLOW FOR MINIMAL INTERCYLINDER SPACE

BACKGROUND OF THE INVENTION

The present invention relates to a metallic gasket designed to be interposed between the joining surfaces of a cylinder head and a cylinder block which form part of an internal combustion engine, thereby preventing leakages of combustion gas, cooling water, lubricating oil, etc.

DESCRIPTION OF THE PRIOR ART

Between the joining surfaces of a cylinder block and a cylinder head forming part of an internal combustion engine, there is interposed a gasket to impart a sealing function thereto, as well known in the art. Of particular importance is a seal to be provided around a combustion chamber. A failure in providing sufficient sealing to the combustion chamber would cause a leakage of the combustion gas from within, resulting in a pressure drop.

According to one approach for solving this problem, an array of beads are located concentrically with a combustion chamber bore formed in an elastic base plate of a metallic gasket. As the metallic gasket is clamped in place by means of bolts, the beads produce repulsive force, which is in turn used to impart a sealing function to the peripheral edge of the combustion chamber. In order to prevent the breaking-down of the beads by fatigue in this case, for instance, stoppers are located on flat segments of the metallic gasket between the combustion chamber bore and the beads, thereby limiting the magnitude of amplitude of the beads so as to prevent their complete yielding.

FIG. 8 is a sectional view illustrating a conventional metallic gasket, showing only an inter-cylinder part for the purpose of simplicity. Reference numerals 10-1 and 10-2 stand for base plates, each formed of a resilient material. While an auxiliary plate 12 covered with a shim plate 11 is sandwiched between the base plates, arched beads 13-1 and 13-2 are symmetrically located thereon in opposite relation. The shim plate 11 is then folded down at both its ends to form bends serving as stoppers. That is, these bends limit the amplitude of the beads due to vibration.

In recent years, however, higher-performance and weight-saving engines of smaller size and larger displacement have been in great demand, resulting in a drop of their rigidity. In addition, closely cylindered engines are now often needed because of increasing displacement without changing their inter-bore pitch and reducing their overall size. Therefore, even with a metallic gasket using arched beads as the beads so as to limit the magnitude of vibrational amplitude thereof, there is no sufficient room for providing stoppers.

For instance, when the stopper is 1.5 mm or below in width, a pressure produced by bolting is received at an area so narrow that a very high pressure is applied to the stopper. In addition to such a high pressure produced by bolting, the amplitude of vibration by the operation of an engine is applied to the stopper in the form of waves. Consequently, the surface of the engine sealed deforms, making sealing gradually incomplete.

SUMMARY OF THE INVENTION

In view of the foregoing, the present invention seeks to provide a metallic gasket which is applicable to a closely cylindered engine, while making use of an arched bead-to-stopper arrangement.

DETAILED DESCRIPTION OF THE EMBODIMENTS

The present invention will now be explained more illustratively but not exclusively with reference to the accompanying drawings.

Figure 1:
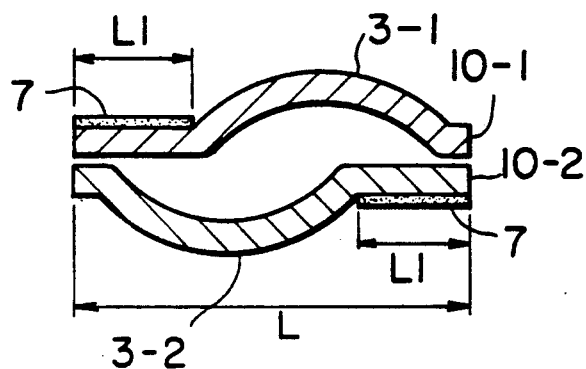
FIG. 1 is a schematic view of one embodiment of the metallic gasket according to this invention.
Figure 5:
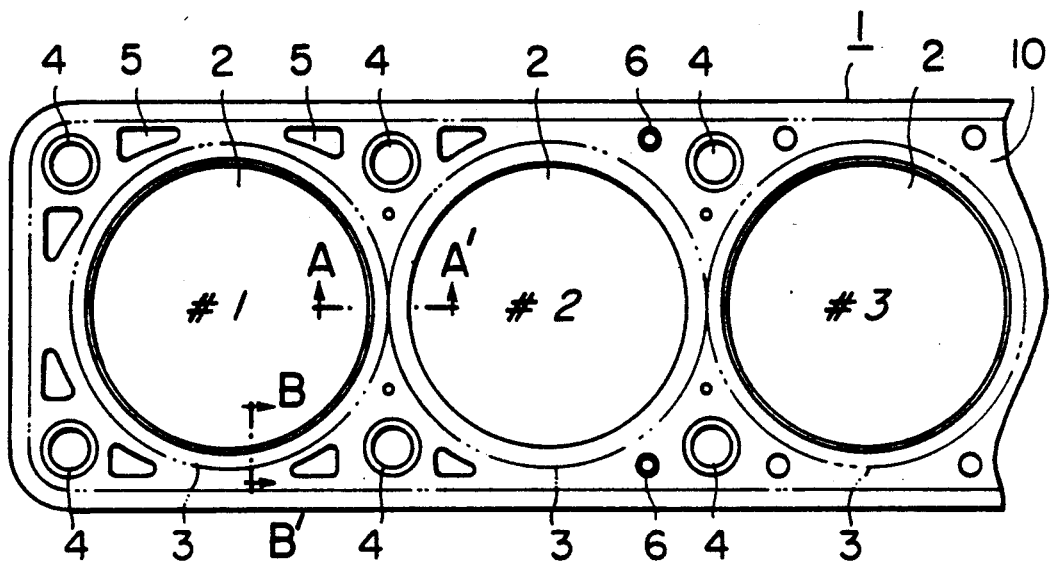
FIG. 5 is a partly cut-away, schematic plan view showing part of the metallic gasket.

FIG. 1 is a sectional view illustrative of one embodiment of the metallic gasket for a multi-cylindered arrangement according to this invention, and FIG. 5 is a partly cut-away, schematic plan view of that metallic gasket; FIG. 1 is a sectional view taken along the line A—A' of FIG. 5.

Referring first to the general plan construction shown in FIG. 5, a metallic gasket body, shown at 1, includes a base plate 10 made of an elastic material. As illustrated in FIG. 1, the base plate 10 is constructed from upper and lower plates 10-1 and 10-2, and has openings 2 located in association with combustion chamber bores, each of which is provided at its outer edge with a concentric array of beads 3, as will be described later. It is noted that reference numeral 4 is a bolt hole through which a bolt or screw is inserted to fix the metallic gasket in place when it is built in an engine, 5 a hole through which cooling water circulates, and 6 an oil hole.

The construction of the metallic gasket will now be explained with reference to FIG. 1.

As mentioned above, the metallic gasket is basically constructed from two upper and lower plates 10-1 and 10-2. One plate 10-1 is provided with an arched bead 3-1 which is associated with an odd-numbered cylinder alone and displaced righthandedly from the center of an inter-cylinder space L to define a flat segment $L_1$ on the left side. A stopper 7 is attached to this flat segment. The other base plate 10-2 is provided with an arched bead 3-2, which is associated with an even-numbered cylinder alone and displaced lefthandedly from the center of the inter-cylinder space L to define a flat segment $L_1$ in the opposite or right side. A stopper 7 is attached to this flat segment $L_1$. Thus, the upper and lower base plates 10-1 and 10-2 are alternately provided with the stoppers. In other words, the bead 3-1 on the base plate 10-1 is located on the outer edge of a cylinder #1 with the bead location being somewhat shifted toward a cylinder #2, not lying at the center of the inter-cylinder space L. Consequently, the flat segment $L_1$ that is relatively long is defined at the left end of the inter-cylinder space L to receive the stopper 7.

The bead 3-1 on the base plate 10-2, on the other hand, is located on the outer edge of the cylinder #2 and, contrary to the above-mentioned bead 3-1, is shifted toward the cylinder #1. Consequently, the flat segment $L_1$ is defined at the right end of the inter-cylinder space L to receive the associated stopper 7. In other words, the base plates 10-1 and 10-2 are laminated together antisymmetrically with respect to the bead locations.

In the thus formed metallic gasket arrangement, the arched beads are displaced with respect to each other in a limited space between the adjacent cylinders, enabling flat segments to be defined on the opposite sides. For instance, the flat segment is defined on the left side of the base plate 10-1 on which the bead 3-1 is located righthandedly, while the flat segment is defined on the right side of the base plate 10-2 on which the bead 3-2 is located lefthandedly.

It is well-known that beads having a width less than 2 mm decrease in the amount to follow deformation. In a conventional arrangement, therefore, an inter-cylinder space L should be at least 5 mm in order to leave stopper locations, each of 1.5 mm in width, at both ends of each bead. According to the above-mentioned embodiment of this invention wherein the beads are displaced with respect to each other in an opposite direction to define flat segments on the opposite sides on which stoppers are to be positioned, however, it is possible to find sufficient stopper spaces of 1.5 mm or more in width at the thus formed flat segments.

It is understood that the base plates may be formed of springy SUS 301 or SUS 304 (JIS), with a thickness lying in the range of 0.20 to 0.30 mm. It is also noted that the stoppers may be formed of an alloy consisting of, e.g., 20% of nickel and 20% of zinc and 60% of copper by flame spraying with a thickness lying in the range of 0.05 to 0.15 mm.

Figure 2:
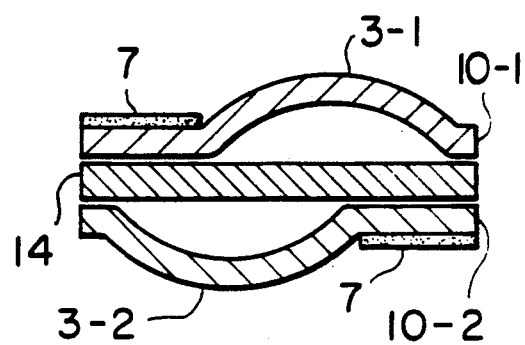
FIGS. 2 to 4 show the constructions of further embodiments of this invention.

FIG. 2 illustrates the construction of another embodiment of the metallic gasket according to this invention. In FIG. 2, the same parts as in FIG. 1 are indicated by the same reference numerals and so will be not explained.

In this embodiment, an auxiliary plate 14 is sandwiched between base plates 10-1 and 10-2, each having an arched bead on its outside. Obviously, this embodiment is applicable to an engine including a close array of cylinders to ensure stopper spaces of sufficient width.

It is noted that the auxiliary plate 14 may be formed of SUS 304 or JIS SPC with a thickness lying in the range of 0.3 to 1.5 mm.

Figure 3:
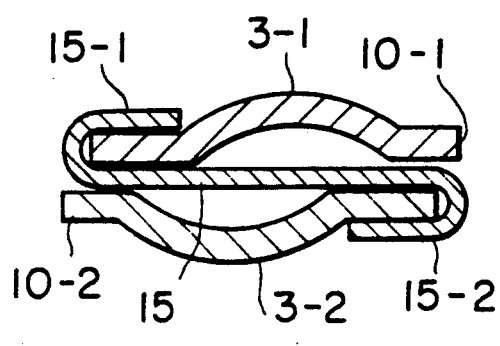

FIG. 3 illustrates the construction of a further embodiment of the metallic gasket according to this invention.

In this embodiment, a shim plate 15 is inserted between base plates 10-1 and 10-2 and is folded up and down at its ends to form folds 15-1 and 15-2 serving as stoppers. Even with this embodiment, stopper locations of sufficient width are achievable, as is the case with the foregoing embodiments. It is noted that the shim plate may be formed of SUS 304 or SUS 301 with a thickness lying usually in the range of 0.08 to 0.15 mm.

Figure 4:
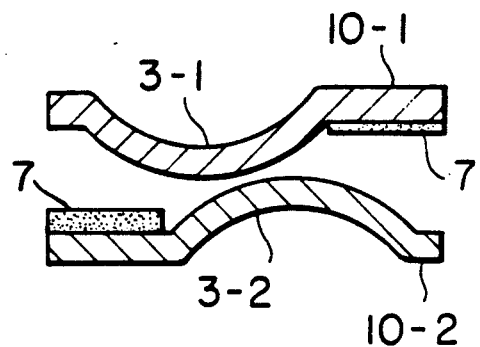

FIG. 4 shows the construction of a still further embodiment of the metallic gasket according to this invention.

In this embodiment, the apices of arched beads 3-1 and 3-2 are displaced from each other, while they are located oppositely to each other, forming diagonally flat segments on the insides of base plates, on which stoppers 7 are provided. According to this embodiment, not only are stopper locations ensured, but also a more increased pressure is obtained on the metallic gasket between cylinders. This because one bead engages another or the associated bead at their apices, thereby increasing the spring constant at the bead locations.

This embodiment also shows that one of the stoppers 7 can have a thickness greater than the other stopper 7. This arrangement can be used in other embodiments of the present invention, such as that shown in FIGS. 1, 2 and 6(a).

Figure 6A:
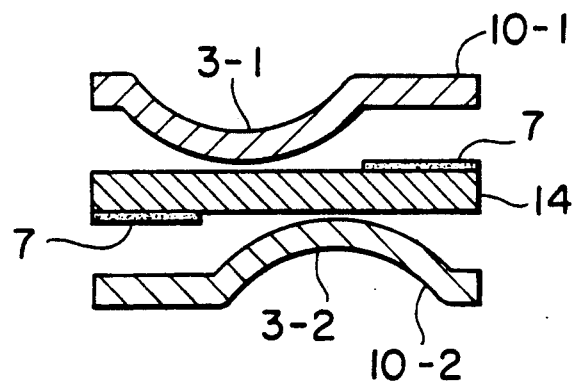
FIGS. 6 and 7 illustrate the constructions of still further embodiments of this invention.
Figure 6B:
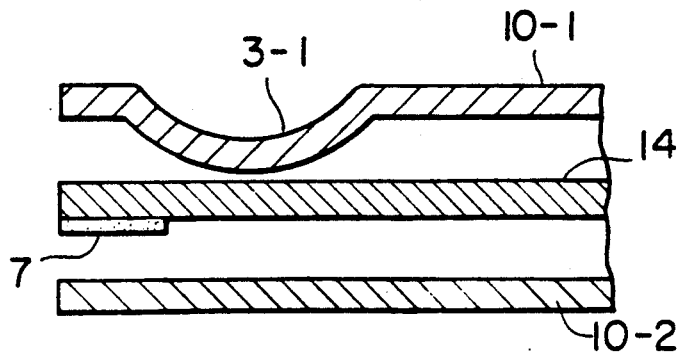

FIG. 6 shows the construction of a still further embodiment of the metallic gasket according to this invention, FIG. 6(a) being a sectional view taken along the line A—A' of FIG. 5 and FIG. 6(b) a sectional view taken along the line B-B' of FIG. 5.

In this embodiment, an auxiliary plate 14 is sandwiched between base plates 10-1 and 10-2, each having an arched bead 3-1 or 3-2 on its inside. Stoppers 7 are then provided on the auxiliary plate 14. Even with this embodiment, effects similar to those already mentioned are achievable.

Figure 7:
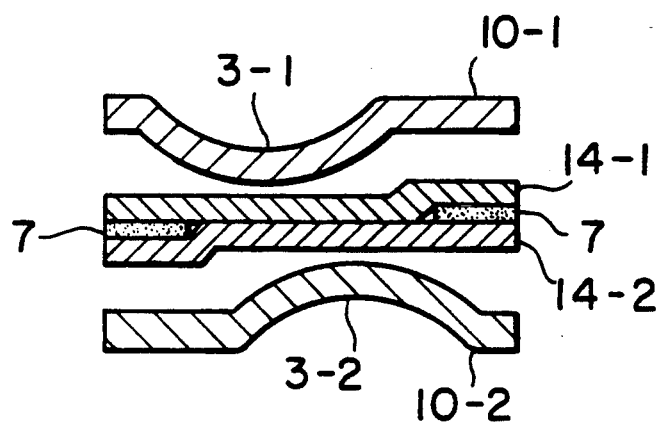
Figure 8:
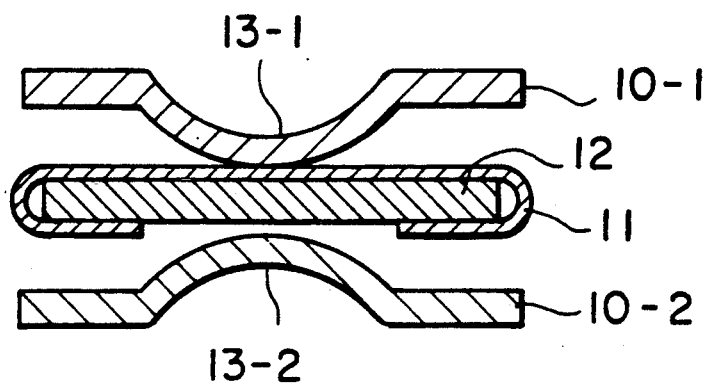
FIG. 8 illustrates a conventional metallic gasket.

FIG. 7 shows the construction of a still further embodiment of the metallic gasket according to this invention.

In this embodiment, an auxiliary plate is divided into two parts 14-1 and 14-2, between which stoppers are interposed. It is noted that when the stoppers are formed of a porous material by flame spraying, the pores need not be filled because of being covered with the parts 14-1 and 14-2. According to this embodiment wherein two-part sealing is achieved by both the stoppers and the beads, further improvements in sealing performance are obtained.

The above six embodiments have been described while making no particular reference to what forms the stoppers. It should be understood, however, that they may be formed of metals by flame spraying or plating, made of flat metal materials or molded of metal materials.

According to the present invention as detailed above, an array of beads are provided on each of two base plates which are antisymmetrically laminated together. One base plate is provided with an array of beads which are associated with an odd-numbered cylinder and are displaced righthandedly from the center of an inter-cylinder space to define flat segments, while the other base plate is provided with an array of beads which are associated with an even-numbered cylinder and displaced lefthandedly from the center of the inter-cylinder space, while stoppers are located on the outside of the laminate. Thus, it is possible to provide a metallic gasket which enable sufficient stopper locations to be assured in limited spaces between adjacent cylinders.

What is claimed is:

1. A metallic gasket comprising first and second elastic metal base plates, each said base plate having openings corresponding to combustion chamber bores, said openings having a predetermined distance therebetween, said first base plate having first flat segments arranged around and adjacent to odd number cylinder openings and first arched beads arranged around said first flat segments, said second base plate having second flat segments arranged around and adjacent to even number cylinder openings and second arched beads arranged around said second flat segments, wherein said first and second base plates are laminated together with said predetermined distance between said openings having said first and second beads respectively overlapping said second and first flat segments.

2. The metallic gasket of claim 1, wherein said first and second base plates extend along a plane so that a line perpendicular to said plane intersects apexes of said first beads and non-apex curved portions of corresponding said second beads.

3. The metallic gasket of claim 1, wherein stoppers are provided on said first and second flat segments.

4. The metallic gasket of claim 3, wherein said first and second base plates are made of a material different than that of said stoppers.

5. The metallic gasket of claim 3, wherein an auxiliary plate is sandwiched between said first and second base plates.

6. The metallic gasket of claim 1, wherein a shim plate is sandwiched between said first and second base plates and peripheral edges of said shim plate surrounding said combustion chamber bores are U-shaped and respectively retain the first and second flat segments therein for forming a stopper.

7. The metallic gasket of claim 1, wherein an auxiliary plate is sandwiched between said first and second base plates and a stopper is provided at both ends of said auxiliary plate, a first stopper arranged on an upper portion of said auxiliary plate and a second stopper arranged on a lower portion of said auxiliary plate.

8. The metallic gasket of claim 1, wherein an auxiliary plate is sandwiched between said first and second base plates, said auxiliary plate including two sheets having a stopper interposed therebetween.

9. The metallic gasket of claim 3, wherein said stoppers are of different thicknesses with respect to each other.

10. The metallic gasket of claim 5, wherein said stoppers are of different thicknesses with respect to each other.

11. The metallic gasket of claim 7, wherein said first stopper is of a different thickness than said second stopper.

12. The metallic gasket of claim 5, wherein said first and second base plates are made of a material different than that of said stoppers.

13. The metallic gasket of claim 7, wherein said first and second base plates are made of a material different than that of said stoppers.

* * * * *